(12) United States Patent
Viswanathan et al.

(10) Patent No.: US 9,880,267 B2
(45) Date of Patent: Jan. 30, 2018

(54) HYBRID DATA ACQUISITION IN SCANNED BEAM DISPLAY

(71) Applicant: Microvision, Inc., Redmond, WA (US)

(72) Inventors: P. Selvan Viswanathan, Bellevue, WA (US); Jari Honkanen, Monroe, WA (US); Bharath Rajagopalan, Redmond, WA (US); Alexander Tokman, Kirkland, WA (US)

(73) Assignee: Microvision, Inc., Redmond, WA (US)

( * ) Notice: Subject to any disclaimer, the term of this patent is extended or adjusted under 35 U.S.C. 154(b) by 250 days.

(21) Appl. No.: 14/845,963

(22) Filed: Sep. 4, 2015

(65) Prior Publication Data
US 2017/0068393 A1 Mar. 9, 2017

(51) Int. Cl.
| | |
|---|---|
| *G01S 7/486* | (2006.01) |
| *H04N 9/31* | (2006.01) |
| *G06F 3/042* | (2006.01) |
| *G06F 3/041* | (2006.01) |
| *G01S 17/10* | (2006.01) |
| *G06F 3/037* | (2013.01) |
| *G01S 17/89* | (2006.01) |

(52) U.S. Cl.
CPC ............ *G01S 7/4865* (2013.01); *G01S 17/10* (2013.01); *G01S 17/89* (2013.01); *G06F 3/037* (2013.01); *G06F 3/0416* (2013.01); *G06F 3/0423* (2013.01); *H04N 9/3161* (2013.01); *G06F 2203/04101* (2013.01)

(58) Field of Classification Search
CPC .......... G06F 3/037; G06F 2203/04101; G01S 17/89; H04N 9/3161
See application file for complete search history.

(56) References Cited

U.S. PATENT DOCUMENTS

| | | | | |
|---|---|---|---|---|
| 4,450,356 A | * | 5/1984 | Murray | ................ G01N 21/39 250/338.5 |
| 7,609,875 B2 | | 10/2009 | Liu et al. | |
| 7,768,505 B2 | * | 8/2010 | Ishihara | ............. G06F 3/03545 178/18.09 |
| 8,446,571 B2 | | 5/2013 | Fiess et al. | |
| 9,098,931 B2 | | 8/2015 | Shpunt et al. | |
| 9,267,787 B2 | | 2/2016 | Shpunt | |
| 9,651,417 B2 | | 5/2017 | Shpunt et al. | |
| 9,677,878 B2 | | 6/2017 | Shpunt et al. | |
| 2003/0063775 A1 | * | 4/2003 | Rafii | ....................... G01C 3/08 382/106 |
| 2011/0313722 A1 | * | 12/2011 | Zhu | ....................... G01S 7/4802 702/159 |
| 2012/0312956 A1 | * | 12/2012 | Chang | ..................... G06F 3/017 250/201.1 |
| 2013/0107000 A1 | * | 5/2013 | Xue | ....................... G01S 17/023 348/46 |
| 2014/0085610 A1 | * | 3/2014 | Viswanathan | ....... H04N 9/3129 353/31 |

(Continued)

*Primary Examiner* — Antonio Xavier

(74) *Attorney, Agent, or Firm* — Kevin D. Willis

(57) ABSTRACT

A scanning display system includes hybrid data acquisition. Data can be acquired in a time-of-flight mode, or in a non-time-of-flight mode. Infrared light pulses may be used in both modes. The infrared light pulses may have different characteristics. Time-of-flight data acquisition and non-time-of-flight data acquisition may be used sequentially or simultaneously.

14 Claims, 10 Drawing Sheets

(56) References Cited

U.S. PATENT DOCUMENTS

| | | | | |
|---|---|---|---|---|
| 2014/0232699 A1* | 8/2014 | Viswanathan | G06F 3/0386 | 345/179 |
| 2014/0282224 A1* | 9/2014 | Pedley | G06F 3/017 | 715/784 |
| 2014/0300870 A1* | 10/2014 | Nishioka | G06F 3/0423 | 353/31 |
| 2014/0307248 A1* | 10/2014 | Giger | G01S 7/483 | 356/5.01 |
| 2015/0116672 A1* | 4/2015 | Woltman | G03B 21/2086 | 353/85 |
| 2015/0124242 A1* | 5/2015 | Pierce | A01D 34/008 | 356/5.01 |
| 2015/0192677 A1 | 7/2015 | Yu et al. | | |
| 2015/0281678 A1* | 10/2015 | Park | H04N 5/23238 | 348/43 |
| 2015/0285625 A1* | 10/2015 | Deane | G01S 17/10 | 348/140 |
| 2015/0296201 A1* | 10/2015 | Banks | G01S 7/4816 | 348/47 |
| 2015/0346325 A1* | 12/2015 | Giacotto | G01C 3/08 | 356/5.01 |
| 2016/0011670 A1* | 1/2016 | Kamamori | G06F 3/017 | 345/173 |
| 2016/0054447 A1* | 2/2016 | Sun | G01S 17/89 | 356/5.01 |
| 2016/0061941 A1* | 3/2016 | Guo | G01S 7/497 | 356/4.02 |
| 2016/0187469 A1* | 6/2016 | Jeong | G01S 17/023 | 356/5.01 |
| 2016/0195386 A1 | 7/2016 | Yoon et al. | | |
| 2016/0245919 A1* | 8/2016 | Kalscheur | G01S 17/89 | |
| 2016/0259038 A1* | 9/2016 | Retterath | G01S 7/4802 | |
| 2016/0295193 A1* | 10/2016 | Van Nieuwenhove | H04N 3/1593 | |
| 2016/0299219 A1* | 10/2016 | Suzuki | G01S 17/10 | |
| 2016/0320486 A1* | 11/2016 | Murai | G01S 7/4868 | |
| 2016/0349925 A1* | 12/2016 | Kamamori | G06F 3/017 | |
| 2016/0369332 A1* | 12/2016 | Rothberg | H01S 3/1118 | |
| 2017/0052632 A1* | 2/2017 | Kamamori | G06F 3/0416 | |
| 2017/0090032 A1 | 3/2017 | Ridderbusch | | |
| 2017/0090034 A1 | 3/2017 | Ridderbusch | | |
| 2017/0153319 A1 | 6/2017 | Villeneuve et al. | | |
| 2017/0176596 A1 | 6/2017 | Shpunt et al. | | |
| 2017/0205873 A1 | 7/2017 | Shpunt et al. | | |
| 2017/0244955 A1 | 8/2017 | Shpunt et al. | | |
| 2017/0263408 A1* | 9/2017 | Lozano | H01J 1/304 | |

* cited by examiner

US 9,880,267 B2

HYBRID DATA ACQUISITION IN SCANNED BEAM DISPLAY

FIELD

The present invention relates generally to scanned beam display systems, and more specifically to data acquisition in scanned beam display systems.

BACKGROUND

Interactive scanned beam display systems typically acquire data that relates to the position or movement of pointing objects in the field of view of the display. The data relating to the pointing objects is then mapped to events that can be consumed by a processing device. For example, pointing object data may be mapped to gestures, touch events, mouse clicks, or the like.

DESCRIPTION OF EMBODIMENTS

Figure 1:
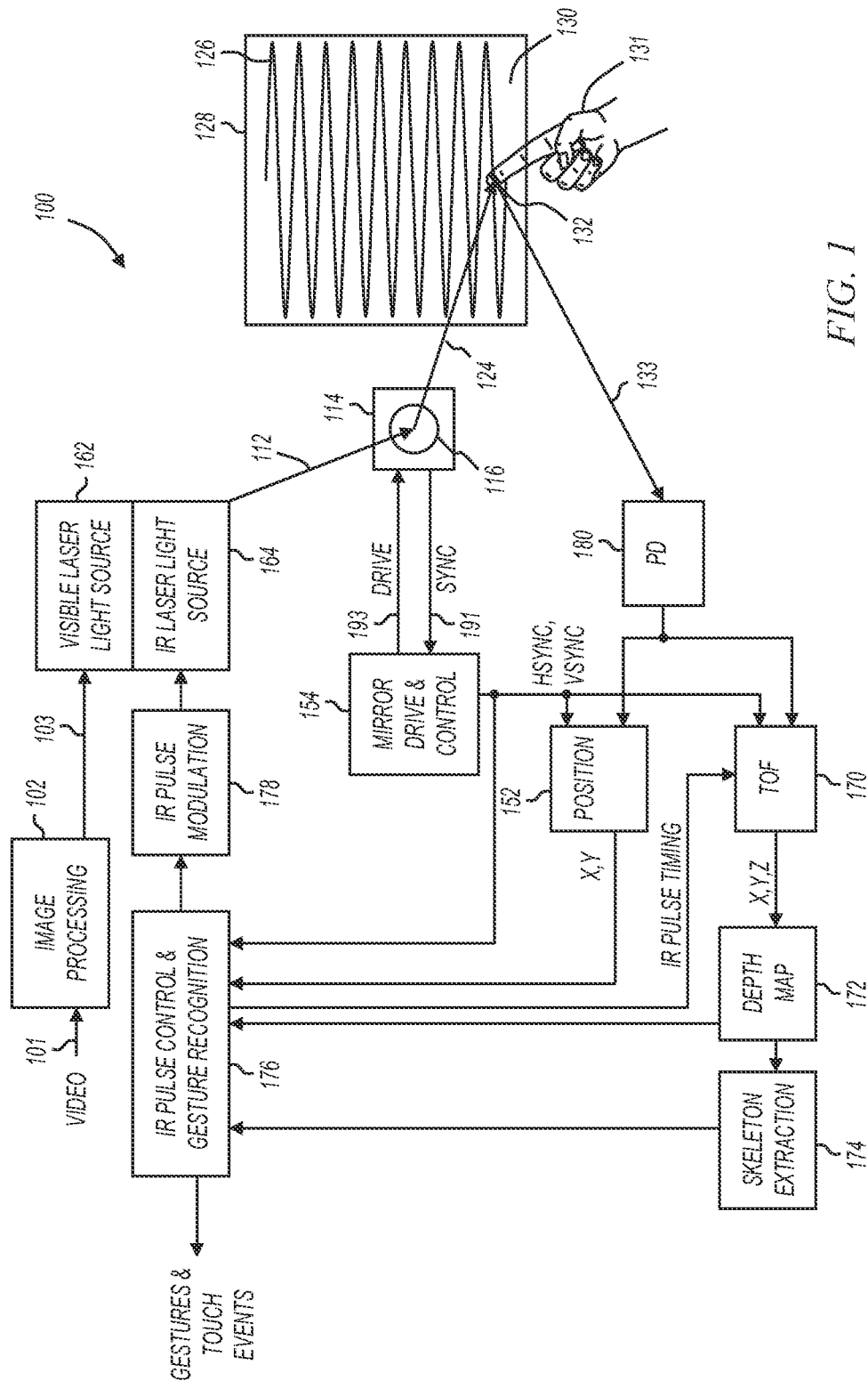
FIGS. 1 and 2 show scanned beam display systems with hybrid data acquisition in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanned beam display system with hybrid data acquisition in accordance with various embodiments of the present invention. System 100 includes image processing component 102, light sources 162 and 164, scanning platform 114 with scanning mirror 116, and mirror drive and control circuit 154. System 100 also includes photodetector (PD) 180, position detection circuit 152, time-of-flight (TOF) detection circuit 170, depth map storage 172, skeleton extraction circuit 174, infrared (IR) pulse control and gesture recognition circuit 176, and IR pulse modulation circuit 178.

Light sources 162 and 164 may be laser light sources such as laser diodes or the like, capable of emitting a laser beam 112. The beam 112 impinges on a scanning platform 114 which is part of a microelectromechanical system (MEMS) based scanner or the like, and reflects off of scanning mirror 116 to generate a controlled output beam 124. A scanning mirror drive and control circuit 154 provides one or more drive signal(s) 193 to control the angular motion of scanning mirror 116 to cause output beam 124 to generate a raster scan 126 on a projection surface 128. In operation, light sources 162 and/or 164 produce light pulses and scanning mirror 116 reflects the light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension.

In operation, mirror drive and control circuit 154 provides drive signal(s) 193 to control the angular motion of scanning mirror 116. In some embodiments, scanning mirror 116 includes one or more sensors to detect the angular position or angular extents of the mirror deflection (in one or both dimensions), and this information is provided back to mirror drive and control circuit 154 as one or more sync signals 191. In these embodiments, mirror drive and control circuit 154 includes a feedback loop to modify the drive signals in response to the measured angular deflection of the mirror.

Mirror drive and control circuit 154 is implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

In some embodiments, light source 162 sources visible light. For example, light source 162 may include sources of red, green, and blue laser light. In these embodiments, visible light sources 162 are modulated to produce color pixels that are used to create an image as output beam 124 traverses raster scan 126.

Image processing component 102 receives video data on node 101 and produces pixel data on node 103 used to drive light source(s) 162 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Raster scan 126 does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

In some embodiments, light source 164 sources nonvisible light such as infrared (IR) light. In these embodiments, PD 180 is able to detect the same wavelength of nonvisible light. For example, in some embodiments, light source 164 may be an infrared laser diode that produces light with a wavelength of substantially 808 nanometers (nm). The wavelength of light is not a limitation of the present invention. Any wavelength, visible or nonvisible, may be used without departing from the scope of the present invention.

System 100 is referred to as including hybrid data acquisition in part because it can acquire data operating in TOF modes and non-TOF modes. For example, position determination circuit 152 provides a first, non-TOF, mechanism to acquire data and TOF detection circuit 170 provides a second, TOF, mechanism to acquire data. Data acquired by position determination circuit 152 includes two dimensional data (x,y) that represents the position of object(s) in the field of view 130. In some embodiments, data acquired by position determination circuit 152 includes three dimensional data (x,y,z); however, the resolution of distance data (z) may be too low for some applications. Data acquired by position Data acquired by TOF detection circuit 170 includes three dimensional data (x,y,z) that represents the position of object(s) in the field of view 130. In some embodiments, position determination circuit 152 is able to acquire the x,y data with greater resolution than TOF detection circuit 170. When TOF detection circuit 170 is acquiring data, system 100 is operating in a TOF data acquisition mode, and when position determination circuit 152 is acquiring data, system 100 is operating in a non-TOF data acquisition mode.

The rate at which IR pulses are created, reflected, and processed in the receive signal path may determine the horizontal spatial measurement resolution on raster pattern 126. For example, if pulses are created far apart in time, then measured points on raster pattern 126 may be further apart, and the horizontal spatial resolution will decrease. Also for example, if pulses are created closer in time, then the horizontal spatial resolution can increase. In some embodiments, horizontal spatial resolution is greater when system 100 is operating in a non-TOF data acquisition mode than it is when operating in a TOF data acquisition mode.

As further described below, in some embodiments, system 100 may first acquire data using TOF detection circuit 170 to determine distances to the projection surface 128 and a pointing object, such as human hand 130. System 100 may at any time and based on any data acquired, switch from using TOF detection circuit 170 to using position detection circuit 152 to acquire data. For example, in some embodiments, system 100 may switch data acquisition methods when the difference between a distance to a pointing object and a distance to the projection surface is below a threshold, thereby indicating a touch event. In some embodiments, position detection circuit 152 is able to determine x,y position data with greater resolution than TOF detection circuit 170, and switching data acquisition methods when a touch event is indicated allows for greater resolution when determining the x,y point at which the touch event occurs.

Position determination circuit 152 receives sync signals from mirror drive and control circuit 154 and also receives a signal from PD 180. In operation, position determination circuit 152 correlates the timing of the signal received from PD 180 with the timing of one or more sync signals received from mirror drive and control circuit 154 to determine an x,y position of an object within the field of view 130. For example, as shown in FIG. 1, a reflector 132 on a user's finger reflects an IR laser light pulse, and position detection circuit 152 determines the x,y position of the reflector (the pointing object) within the field of view 130 by correlating the timing of the reflected IR pulse with the sync signal(s) received from mirror drive and control circuit 154.

Position detection circuit 152 is able to determine the two-dimensional position (x,y) of the pointing object with high resolution. For example, in some embodiments, the field of view 130 is flooded with IR pulses with very small inter-pulse spacing along raster scan 126 when position detection circuit 152 is in operation, and position detection circuit 152 determines the x,y position of the pointing object with very fine granularity. In some embodiments, the IR pulses are spaced the same as visible pixels, so the granularity of position detection is equivalent to the visible pixel spacing. In other embodiments, the IR pulses are spaced more closely than the visible pixels, so the granularity of position detection is finer than the visible pixel spacing.

Position detection circuit 152 may be implemented with any suitable circuit elements. For example, in some embodiments, position detection circuit 152 includes digital and/or analog timers, integrators, correlators, registers, adders, or the like to compare the timing of the reflected IR pulses with the sync signal(s) received from mirror drive and control circuit 154.

Time-of-flight (TOF) detection circuit 170 receives IR pulse timing information from IR pulse control and gesture recognition circuit 176 and compares it to the timing of a received IR pulse to determine the TOF of an IR pulse, thereby measuring the distance to the either the projection surface or the pointing object. An example TOF circuit is described below with reference to FIG. 3.

In some embodiments, TOF detection circuit 170 is able to measure the distance (z) with high precision, but is able to measure the x,y position with less resolution than position determination circuit 152. This may be due in part to IR pulses that have a greater inter-pulse spacing in the field of view.

Depth map storage 172 receives three dimensional (3D) data from TOF detection circuit 170 for various points in the field of view and stores this data as a depth map. Depth map data is provided to both skeleton extraction circuit 174 and IR pulse control and gesture recognition circuit 176.

Depth map storage 172 may be implemented using any suitable circuit structure. For example, in some embodiments, depth map storage 172 is implemented in a dual port memory device that can be written on one port and read on a second port. In other embodiments, depth map storage is implemented as data structures in a general purpose memory device. In still further embodiments, depth map storage 172 is implemented in an application specific integrated circuit (ASIC).

Skeleton extraction circuit 174 receives depth map information from depth map storage 172 and determines whether a pointing object is in the field of view. For example, in some embodiments, skeleton extraction circuit 174 may detect where the user's hand 130 breaks the periphery of the field of view, and then determines the furthest point of the hand from the periphery to find the pointing object. Any skeleton extraction algorithm may be used to determine the location of the pointing object without departing from the scope of the present invention.

Skeleton extraction circuit 174 may be implemented using any suitable hardware and/or software. For example, in some embodiments, skeleton extraction circuit 174 may include a processor such as a microprocessor or graphics processor that operates in accordance with instructions stored in a nontransitory computer readable medium such as a memory device. Any suitable circuits may be used to implement skeleton extraction circuit 174 without departing from the scope of the present invention.

IR pulse control and gesture recognition circuit 170 controls the generation of IR pulses and determines whether system 100 uses position determination circuit 152 or TOF determination circuit 170 to acquire data. For example, IR pulse control and gesture recognition circuit 176 may generate a first IR pulse train with a first inter-pulse spacing, a first modulation characteristic, and a first power level for use with TOF deflection circuit. Based on information received, IR pulse control and gesture recognition circuit 176 may change the inter-pulse spacing, modulation characteristic, and power level for use with position determination circuit 152.

In addition to changing the IR pulse characteristics, IR pulse control and gesture recognition circuit 176 may also recognize gestures. For example, when position data indicates a touch event is occurring, gestures related to those touch events may be detected and forwarded to other processing resources. Also for example, when position data indicates that a touch event is not occurring, gestures made in two dimensions (x,y) may be recognized and forwarded to other processing resources. As used herein, the term "touch event" refers to a pointing object in the field of view touching or nearly touching the projection surface.

IR pulse modulation circuit 178 modulates pulses that are used to drive IR laser light source 164. For example, IR pulse modulation circuit 178 may modify the power level, pulse shape, or any other characteristic of the pulses used to drive IR laser light source 164. In some embodiments, IR pulse modulation circuit 178 modulates IR pulses with a higher power and a triangular waveform shape when system 100 is acquiring data using TOF detection circuit 170, and modulates IR pulses with a lower power and a square waveform shape when system 100 is acquiring data using position determination circuit 152.

Figure 2:
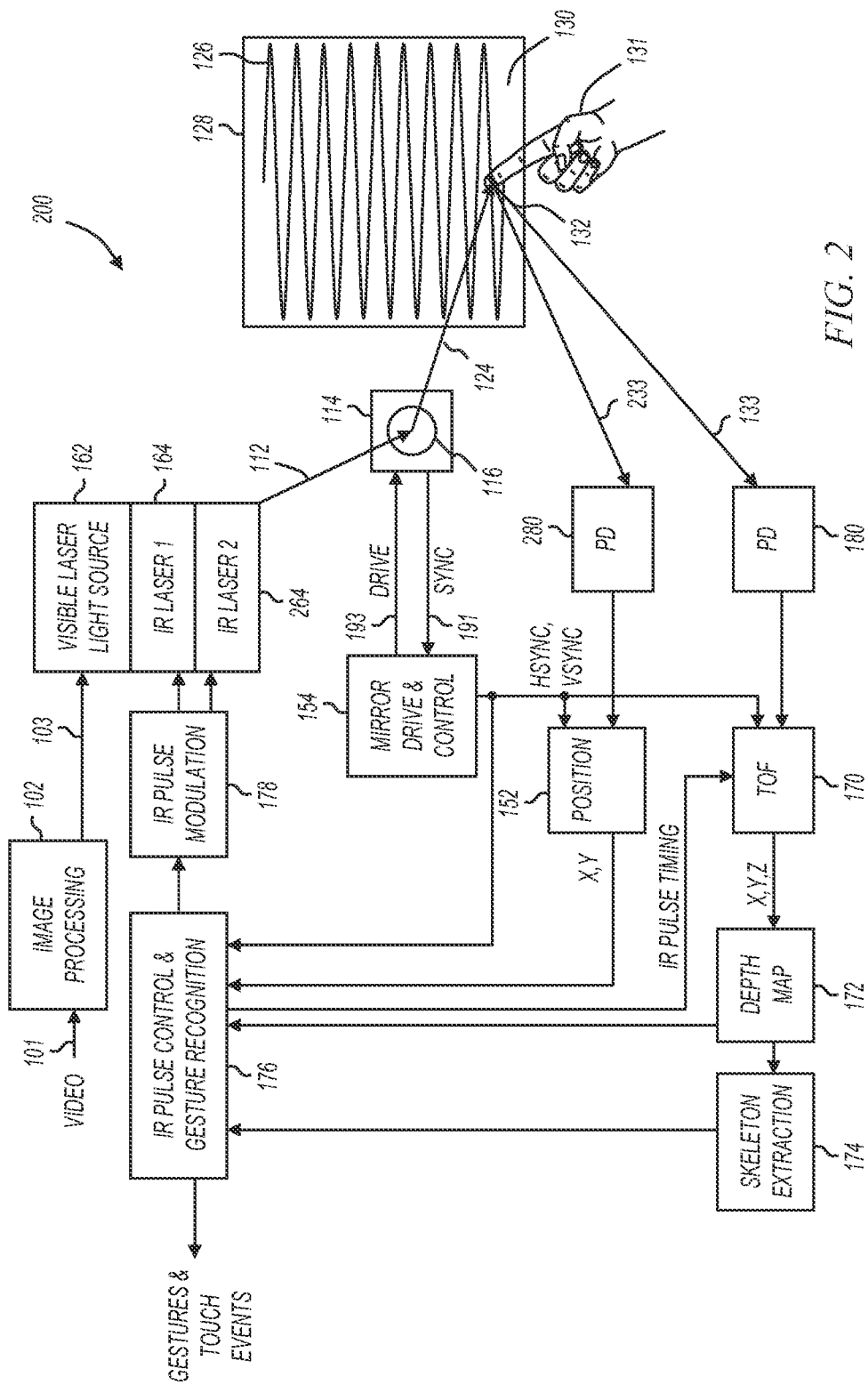

FIG. 2 shows a scanned beam display system with hybrid data acquisition in accordance with various embodiments of the present invention. System 200 includes all of the elements of system 100 with the addition of a second IR laser source 264 and a second PD 280. In some embodiments, IR laser light sources 164 and 264 emit IR light at different wavelengths, and PDs 180 and 280 are tuned to receive light at the respective wavelengths. For example, in some embodiments, IR laser light source 164 emits light at a first wavelength and PD 180 is able to detect light at the first wavelength, whereas IR laser light source 264 emits light at a second wavelength and PD 280 is able to detect light at the second wavelength. In these embodiments, system 200 is able to operate and acquire data in TOF modes and non-TOF modes simultaneously.

Figure 3:
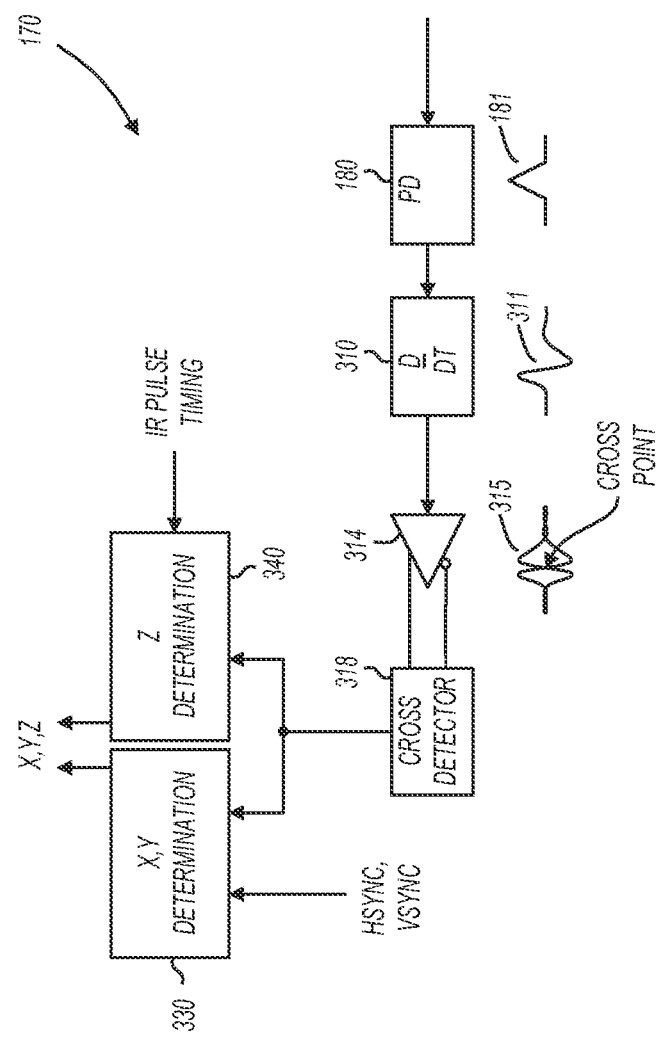
FIG. 3 shows time of flight (TOF) detection circuit in accordance with various embodiments of the present invention.

FIG. 3 shows a time of flight (TOF) detection circuit in accordance with various embodiments of the present invention. TOF detection circuit 170 includes differentiator 310, amplifier 314, cross detector 318, x,y determination circuit 330, and z determination circuit 340. FIG. 2 also shows PD 180.

In some embodiments, when TOF detection circuit 170 is acquiring data, IR pulse modulation circuit 178 (FIG. 1) modulates the outgoing IR pulse with an abruptly changing amplitude (e.g., a triangular waveform shape). The abruptly changing amplitude is useful for timing measurement as is further explained below.

The IR light pulse created by light source 164 is reflected off scanning mirror 116 and is then reflected off projection surface 128 or pointing object 132. The reflected pulse is sensed at photodetector (PD) 180, as shown at 181. The reflected pulse may exhibit significant amplitude variations based on the distance to the projection surface 128, but the abrupt change in amplitude remains largely intact. Differentiator 310 then differentiates the reflected pulse and produces the differentiated pulse shown at 311. It is important to note that the point on pulse 181 corresponding to the abrupt change in amplitude (the peak of the triangle shaped pulse) now corresponds to the rapidly falling portion of the differentiated pulse 311.

Amplifier 314 receives the differentiated pulse 311 and produces a differential output shown at 315. The two differential output signals are shown superimposed on each other at 315, and the point at which they cross is referred to herein as the "cross point". Cross detector 318 receives the differential output signals shown at 315 and detects the timing of the cross point. In some embodiments, cross detector 318 includes a differential amplifier to perform the cross detection.

Cross detector 318 notifies x,y determination circuit 330 and z determination circuit 340 when the cross point is detected. x,y determination circuit 330 correlates the timing of the cross point with one or both of a horizontal sync (HSYNC) and vertical sync (VSYNC) signals to determine the x,y position of the reflected pulse within the field of view. z determination circuit 340 compares the timing of the cross point with the IR pulse timing to determine the time of flight of the pulse corresponding to the distance to the surface that reflected the pulse (the projection surface or the pointing object).

x,y determination circuit 330 may include the same components as position determination circuit 152 (FIG. 1). In some embodiments position determination circuit 152 is used for both position determination circuit 152 and x,y determination circuit 330. z determination circuit 340 may be implemented using any suitable circuits. For example, in some embodiments, z determination circuit 340 includes an analog integrator that is reset when the IR pulse is launched, and is stopped when the cross point is detected. Circuit 340 may also include an analog-to-digital converter to convert the analog integrator output to a digital z value that corresponds to the time-of-flight (TOF) of the IR laser pulse, which in turn corresponds to the distance between system 100 and projection surface 128.

TOF detection circuit 170 provides a robust TOF distance measurement system that is fairly insensitive to reflected pulse amplitude variations due to large variations in target distances and surface reflectivity. For example, the differentiated received light pulse exhibits a zero crossing in place of the peak amplitude of the received pulse. Regardless of the received amplitude, the zero crossing appears at substantially the same relative location within the light pulse, so accurate timing is maintained regardless of amplitude variations.

Figure 4:
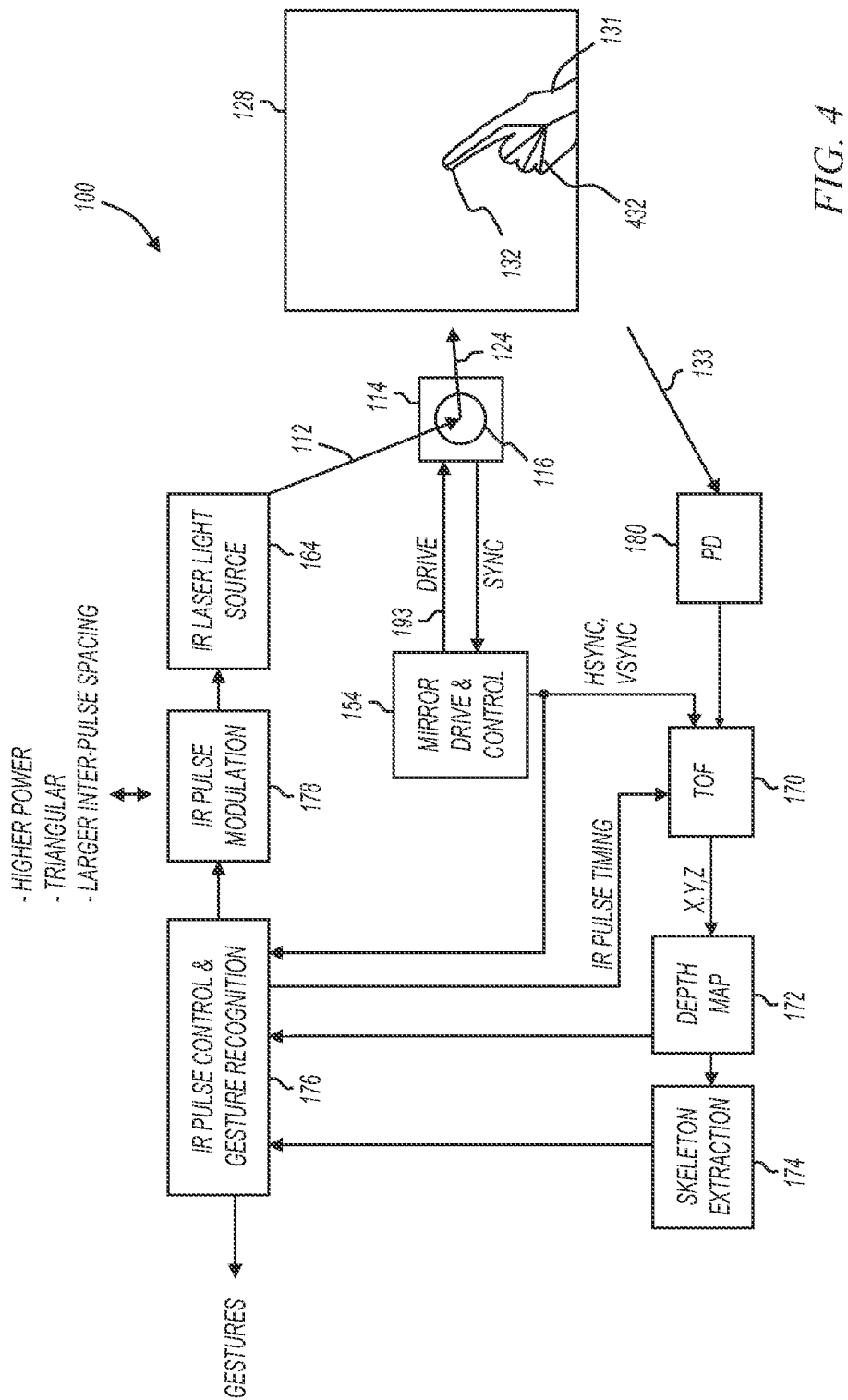
FIG. 4 shows TOF data acquisition operation of scanned beam display systems in accordance with various embodiments of the present invention.

FIG. 4 shows TOF data acquisition operation of scanned beam display systems in accordance with various embodiments of the present invention. In operation during TOF data acquisition, IR pulse control and gesture recognition circuit 176 commands IR pulse modulation circuit 178 to produce pulses with an abrupt change in amplitude as described above with reference to FIG. 3. Circuit 176 also commands IR pulse modulation circuit 178 to create pulses with a higher power and larger inter-pulse spacing relative to IR pulses used for non-TOF data acquisition.

Figure 6:
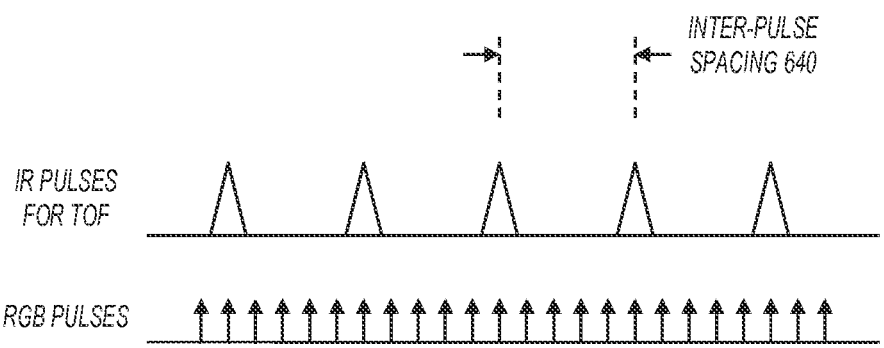
FIG. 6 shows infrared laser light pulses suitable for TOF data acquisition in accordance with various embodiments of the present invention.

Referring now to FIG. 6, an example of IR laser light pulses suitable for TOF data acquisition are shown. FIG. 6 also shows the spacing of visible (RGB) light pulses used to create a visible image. As shown in FIG. 6, in some embodiments, the IR pulses suitable for TOF data acquisition have a triangle waveform modulation characteristic, a relatively higher power level, and an inter-pulse spacing that is larger than the inter-pulse spacing of the visible pulses.

Referring now back to FIG. 4, IR pulses suitable for TOF data acquisition are scanned by mirror 116 across field of view 130. In embodiments with larger inter-pulse spacing, the IR pulses are more sparse in the field of view than are the visible pulses. This results in a data acquisition resolution of x,y data that is less than the visible pixel spacing. As IR pulses are scanned across the field of view, reflections are received by PD 180. TOF detection circuit 170, depth map 172, and skeleton extraction 174 operate as described above, and IR pulse and gesture recognition circuit 176 receives the depth map and skeleton extraction information.

Skeleton extraction circuit 174 extracts a skeleton of the pointing object from the depth map information. An example skeleton that might be extracted is shown at 432. Skeleton extraction circuit 174 also determines the tip 132 of the pointing object, and provides this information to IR pulse control and gesture recognition circuit 176.

In response to the depth map, skeleton data, and pointing object data, IR pulse control and gesture recognition circuit 176 may take one or more actions. For example, in some embodiments, circuit 176 may recognize gestures being made by the pointing object as it moves within the field of view. Gestures include waving, pinching, shaking, or the like. Also for example, circuit 176 may perform different operations based on how close the pointing object is to the projection surface. In some embodiments, if the pointing object is closer than a first threshold to the projection surface, gestures may be interpreted as interacting with displayed content, whereas if the pointing object is farther than the first threshold from the projection surface, gestures may be interpreted as interacting with the system. Any number of thresholds may be defined, and the total distance between the system and the projection surface may be divided into any number of segments without departing from the scope of the present invention.

In some embodiments, IR pulse control and gesture recognition circuit 176 may change the operation of system 100 from a TOF data acquisition mode to a non-TOF data acquisition mode. For example, if the tip 132 of the pointing object is determined to be close to the projection surface (e.g., closer than a fixed threshold value or closer than a percentage of the total distance), then IR pulse control and gesture recognition circuit 176 may modify the IR pulses to be suitable for non-TOF data acquisition.

Figure 5:
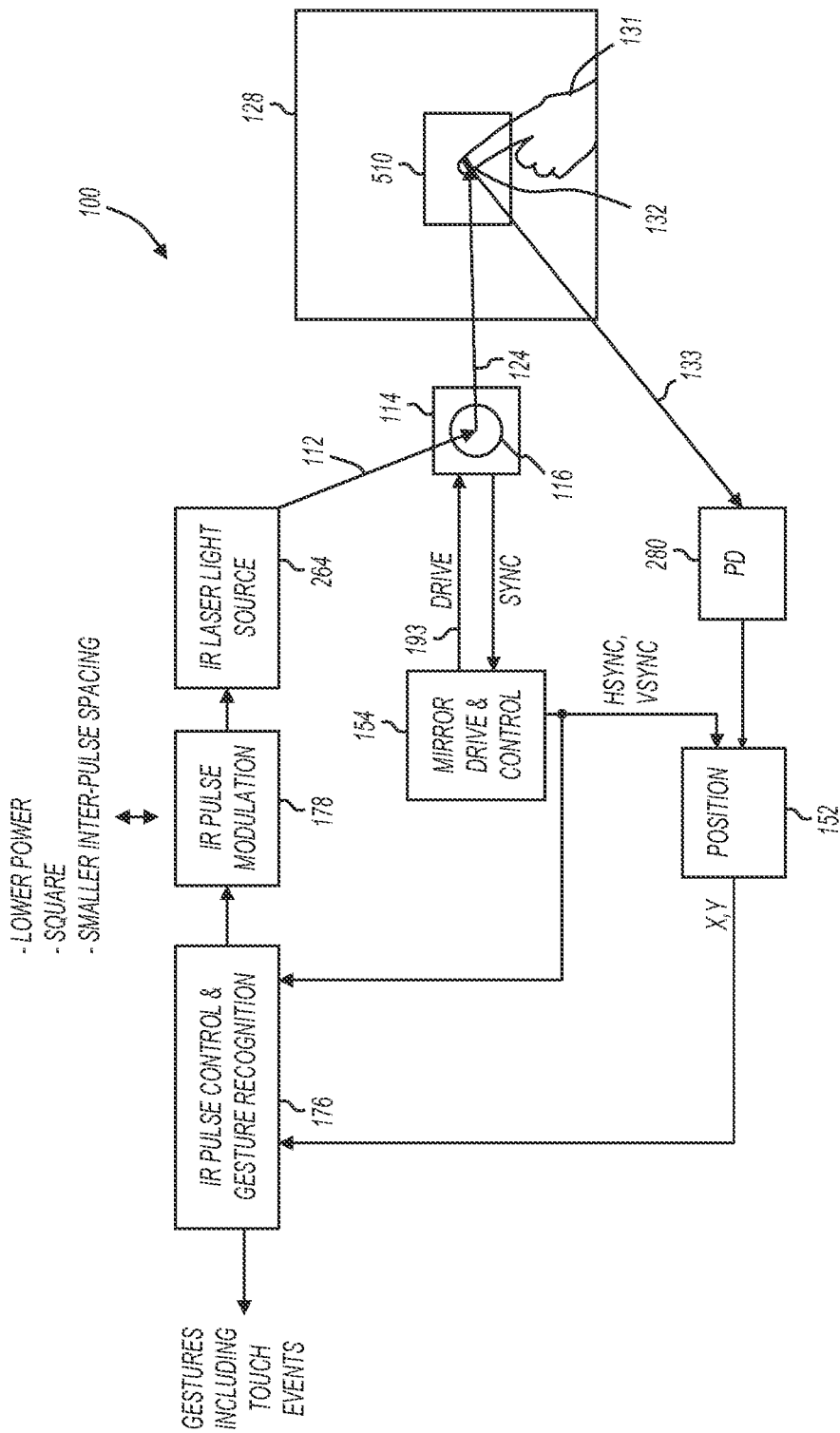
FIG. 5 shows non-TOF data acquisition operation of scanned beam display systems in accordance with various embodiments of the present invention.

FIG. 5 shows non-TOF data acquisition operation of scanned beam display systems in accordance with various embodiments of the present invention. As shown in FIG. 5, IR pulse control and gesture recognition circuit 176 has changed the IR pulses to be suitable for non-TOF data acquisition. In some embodiments, this results in IR pulses with lower power, a square wave modulation characteristic, and a smaller inter-pulse spacing.

Figure 7:
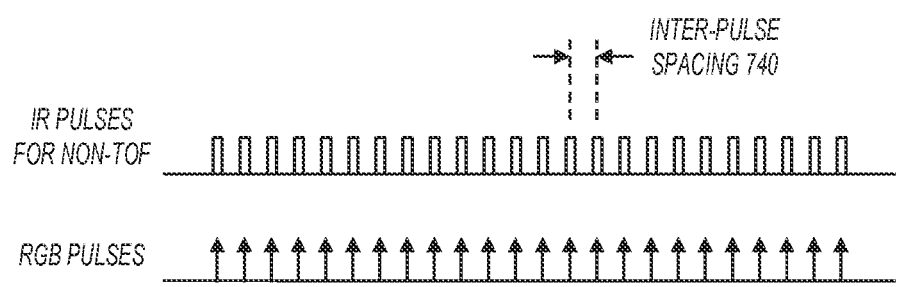
FIG. 7 shows infrared laser light pulses suitable for non-TOF data acquisition in accordance with various embodiments of the present invention.

Referring now to FIG. 7, an example of IR laser light pulses suitable for non-TOF data acquisition are shown. FIG. 7 also shows the spacing of visible (RGB) light pulses used to create a visible image. As shown in FIG. 7, in some embodiments, the IR pulses suitable for non-TOF data acquisition have a square waveform modulation characteristic, a relatively lower power level, and an inter-pulse spacing 740 that is smaller than the inter-pulse spacing of the inter-pulse spacing 640 of the IR pulses suitable for TOF data acquisition. In some embodiments, inter-pulse spacing 740 of IR pulses suitable for non-TOF data acquisition is substantially equivalent to the inter-pulse spacing of the visible pulses.

Referring now back to FIG. 5, IR pulses suitable for non-TOF data acquisition are scanned by mirror 116 across field of view 130. In some embodiments, the IR pulses suitable for non-TOF data acquisition are only scanned in a subset of the entire field of view. For example, IR pulses suitable for non-TOF data acquisition may only be scanned within a region 510 about the tip of the pointing object. In embodiments with smaller inter-pulse spacing, the IR pulses are more dense in the field of view than were the IR pulses used to initially find the x,y location of the tip 132 of the pointing object. This results in increased x,y data resolution, that when combined with the z information already acquired, results in a high resolution three dimensional data point representing the location of pointing object tip 132.

In some embodiments, a reflector such as a retroreflector is used as the pointing object tip. For example, a user may have a retroreflector on the tip of a finger, or may hold a stylus with a retroreflector at a tip. This increases the signal strength of the reflection and aids in the data acquisition.

If the x,y position of the pointing object tip 132 is determined in non-TOF data acquisition mode, then a touch event at the x,y location may be registered as a gesture. If the x,y position of the pointing tip 132 is not determined in non-TOF data acquisition mode, then no touch event is registered. The system may return to TOF data acquisition mode after a touch event is registered, or based on any other criteria. Conditionally, a processing system might process a sequence of touch events in a window of time and especially if it matches a signature pattern, as a gesture event.

FIGS. 4 and 5 have been described as operational modes of system 100 (FIG. 1), although, these same operational modes apply to system 200 (FIG. 2). For example, system 200 may operate in a TOF data acquisition mode in accordance with FIG. 4, and may operate in a non-TOF data acquisition mode in accordance with FIG. 5. Further, system 200 may operate on both modes simultaneously. For example, system 200 may simultaneously emit infrared laser light pulses suitable for TOF data acquisition and non-TOF data acquisition using light sources 164, 264 and receive reflections of both using PDs 180, 280. In operation, both data acquisition modes may be used across the entire field of view, or one may be used across less than all of the field of view. For example, in some embodiments, pulses suitable for TOF data acquisition may emitted across the entire field of view, while pulses suitable for non-TOF data acquisition may be limited to a subset of the field of view (e.g., 510, FIG. 5).

Figure 8:
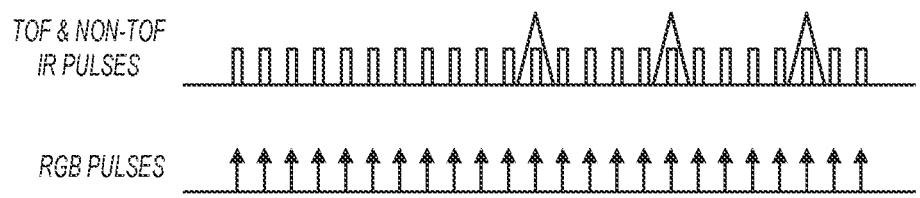
FIG. 8 shows laser light pulses suitable for TOF data acquisition and infrared laser light pulses suitable for non-TOF data acquisition in accordance with various embodiments of the present invention.

FIG. 8 shows laser light pulses suitable for TOF data acquisition and infrared laser light pulses suitable for non-TOF data acquisition in accordance with various embodiments of the present invention. As described above, some embodiments, operate in both TOF data acquisition modes and non-TOF data acquisition modes simultaneously. One example of superimposed pulses is shown in FIG. 8. Any inter-pulse spacing and/or regularity of IR pulses may be used without departing from the scope of the present invention.

Figure 9:
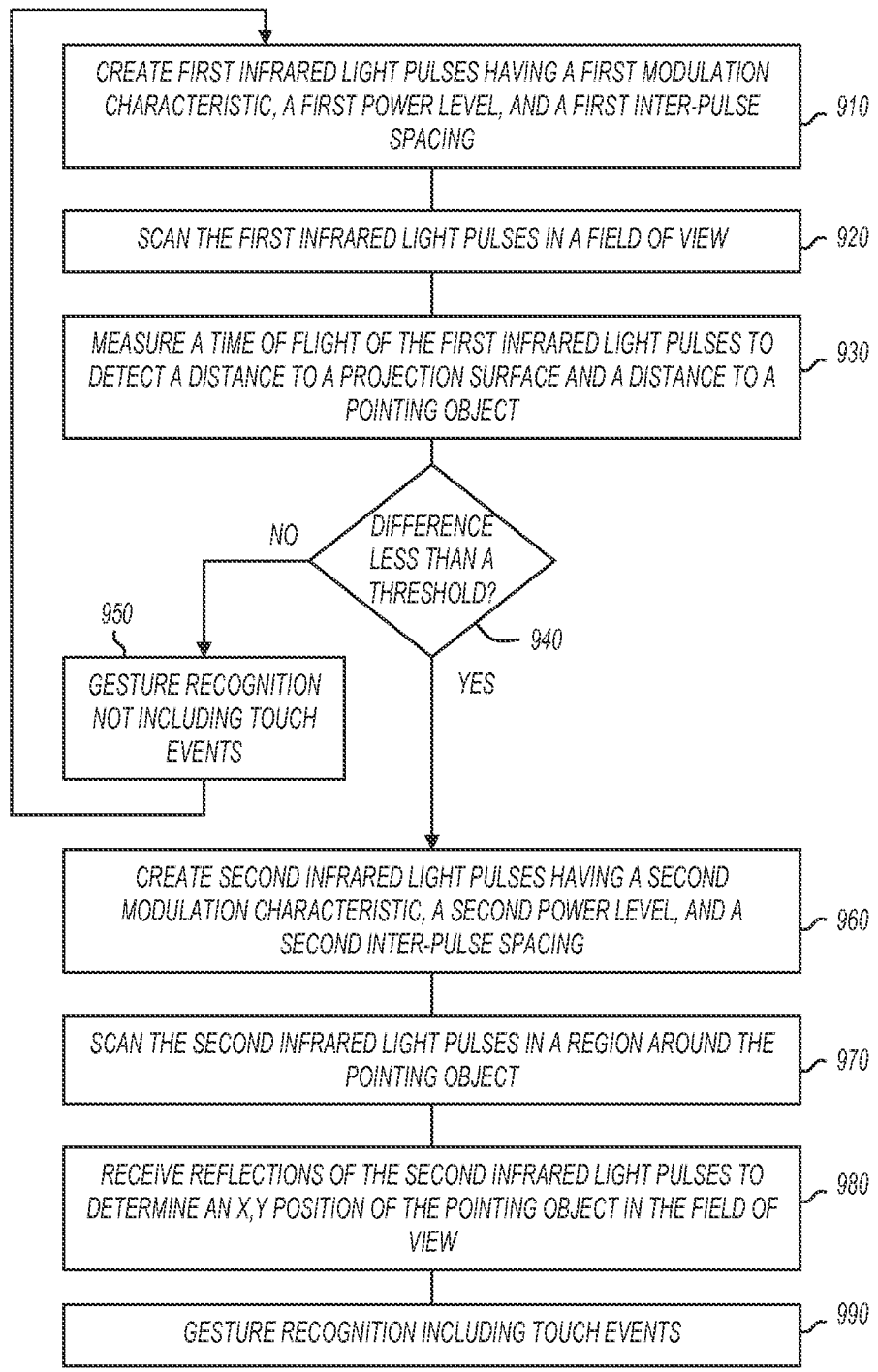
FIGS. 9 and 10 show flow diagrams of methods in accordance with various embodiments of the present invention.

FIG. 9 shows a flow diagram of methods in accordance with various embodiments of the present invention. In some embodiments, method 900, or portions thereof, is performed by an IR pulse control and gesture recognition circuit, embodiments of which are shown in previous figures. Further, in some embodiments, method 900, or portions thereof, is performed by a scanning display system, embodiments of which are shown in previous figures. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910. As shown at 910, first IR light pulses having a first modulation characteristic, a first power level, and a first inter-pulse spacing are created. In some embodiments, this corresponds to IR pulse control and gesture recognition circuit 176 commanding IR pulse modulation circuit 178 to create pulses with the first modulation characteristic, first power level, and first inter-pulse spacing. For example, IR pulse modulation circuit 178 may drive IR laser light source 164 to create laser light pulses having characteristics shown in FIG. 6.

At 920, the first IR light pulses are scanned in a field of view. In some embodiments, this corresponds to the IR light pulses created by IR laser light source 164 being reflected off scanning mirror 116 and following raster scan 126 in field of view 130.

At 930, a TOF of the first IR pulses is measured as the pulses are reflected off the projection surface and any objects in the field of view. For example, referring back to FIG. 1, the TOF of IR pulses reflected off of projection surface 128 are measured to determine a distance to the projection surface, and the TOF of IR pulses reflected off of pointing object 130 are measured to determine a distance to the pointing object. In some embodiments, skeleton extraction is performed to determine the x,y position of the tip of the pointing object in the field of view, and the distance to the tip of the pointing object is determined by measuring the TOF of pulses reflected off the tip of the pointing object.

At 940, the difference between the distance to the projection surface and the distance to the tip of the pointing object is compared to a threshold. This difference represents the distance between the tip of the pointing object and the projection surface. When the difference is very small (e.g., a few millimeters), then the pointing tip may be considered to be touching the projection surface. If the difference is not less than the threshold, then gesture recognition is performed not including touch events at 950. Gestures recognized at 950 may include any gestures that do not include a user touching the projection surface.

If the difference is less than the threshold at 940, then second IR light pulses are created at 960. The second IR light pulses have a second modulation characteristic, a second power level, and a second inter-pulse spacing. In some embodiments, one or more of the second characteristic, the second power level, and the second inter-pulse spacing is identical to the first characteristic, the first power level, and the first inter-pulse spacing. In other embodiments, one or more of the characteristic, power level, and inter-pulse spacing is different.

In some embodiments, the actions of 960 correspond to IR pulse control and gesture recognition circuit 176 changing from TOF data acquisition to non-TOF data acquisition by commanding IR pulse modulation circuit 178 to create pulses with the second modulation characteristic, second power level, and second inter-pulse spacing. For example, IR pulse modulation circuit 178 may drive IR laser light source 164 to create laser light pulses having characteristics shown in FIG. 7.

In some embodiments, the second IR light pulses replace the first IR light pulses. For example, referring now to FIG. 1, a single IR light source 164 may be used to create the first IR light pulses at 910, and the same IR light source may be used create the second IR light pulses at 960. In other embodiments, the second IR light pulses are created along with the first IR light pulses. For example, referring now to FIG. 2, a first light source 164 may be used to create the first IR light pulses, and a second light source 264 may be used to create the second IR light pulses. In these embodiments, the first and second IR light pulse may be created serially or simultaneously.

At 970, the second IR light pulses are scanned in a region around the pointing object. In some embodiments, this corresponds to the second IR light pulses being scanned in region 510 (FIG. 5).

At 980, reflections of the second IR pulses are received to determine an x,y position of the pointing object in the field of view. In some embodiments, this corresponds to a reflection received from a reflector on the pointing object. For example, a user may have a retroreflector exposed within the field of view either on a body part or a stylus, or the like.

In some embodiments, the reflections received at 980 have a higher x,y resolution than the reflections received at 930. This may be in part because the non-TOF data acquisition can use IR pulses with a smaller inter-pulse spacing.

At 990, gesture recognition is performed including touch events. For example, because the tip of the pointing object is less than a threshold distance away from the projection surface, a touch event has occurred.

Figure 10:
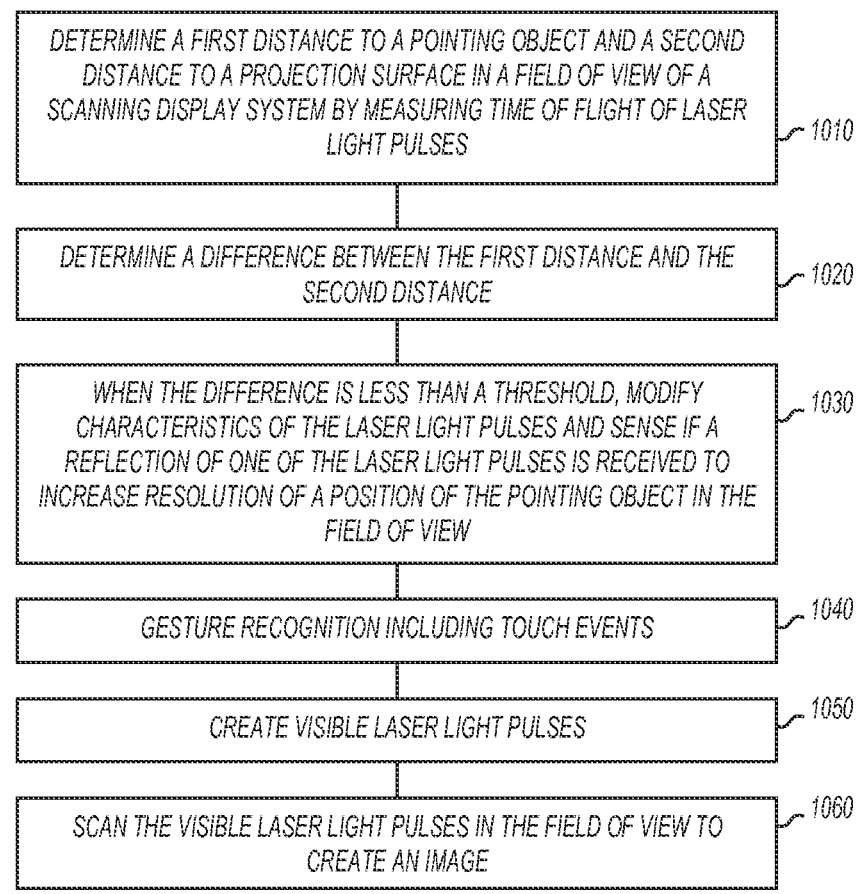

FIG. 10 shows a flow diagram of methods in accordance with various embodiments of the present invention. In some embodiments, method 1000, or portions thereof, is performed by an IR pulse control and gesture recognition circuit, embodiments of which are shown in previous figures. Further, in some embodiments, method 1000, or portions thereof, is performed by a scanning display system, embodiments of which are shown in previous figures. In other embodiments, method 1000 is performed by a series of circuits or an electronic system. Method 1000 is not limited by the particular type of apparatus performing the method. The various actions in method 1000 may be performed in the order presented, or may be performed in a different order. Further, in some embodiments, some actions listed in FIG. 10 are omitted from method 1000.

Method 1000 is shown beginning with block 1010. As shown at 1010, a first distance to a pointing object and a second distance to a projection surface within a field of view of a scanning display system are determined by measuring the TOF of laser light pulses. In some embodiments, this corresponds to a scanning display system operating in a TOF data acquisition mode as described above.

At 1020, a difference between the first distance and the second distance is determined. This difference corresponds to the distance between the pointing object and the projection surface. When this distance is very small, the pointing object can be considered as touching or nearly touching the projection surface.

At 1030, when the difference is less than a threshold, characteristics of the laser light pulses are modified and a reflection of one of the laser light pulses is sensed to increase resolution of a position of the pointing object in the field of view. In some embodiments, this corresponds to changing the laser light pulses from pulses suitable for TOF data acquisition to pulses suitable for non-TOF data acquisition. Examples of pulses suitable for TOF data acquisition are shown in FIG. 6, and examples of pulses suitable non-TOF data acquisition are shown in FIG. 7.

At 1040, gesture recognition is performed including touch events. For example, because the tip of the pointing object is less than a threshold distance away from the projection surface, a touch event has occurred.

At 1050, visible laser light pulses are created and at 1060, the visible laser light pulses are scanned in the field of view to create an image. In some embodiments, the actions of 1050 and 1060 occur simultaneously with one or more of the other actions shown in FIG. 10. For example, a scanning display system may be projection images or video at the same time that the scanning display system is acquiring data in either a TOF mode or non-TOF mode.

In some embodiments, the actions of 1050 and 1060 correspond to imaging processing component 102 providing pixel data to visible laser light source(s) 162, and visible laser light pulses produced by visible laser light source(s) 162 being reflected off scanning mirror 116 to paint visible pixels along raster scan 126.

Figure 11:
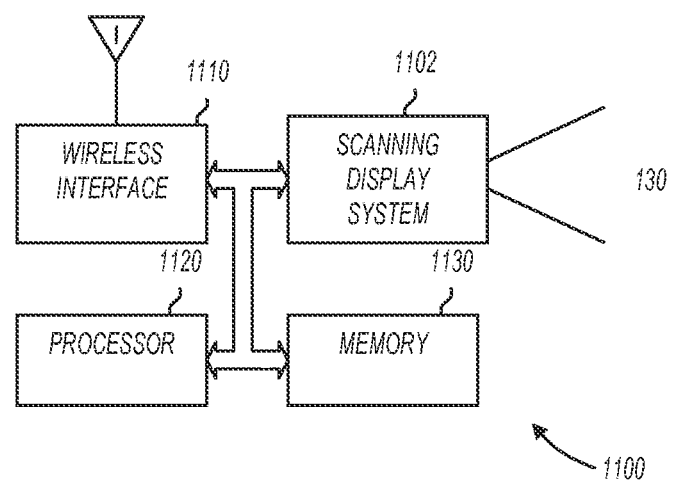
FIG. 11 shows a block diagram of a mobile device in accordance with various embodiments of the present invention.

FIG. 11 shows a block diagram of a mobile device in accordance with various embodiments of the present invention. As shown in FIG. 11, mobile device 1100 includes wireless interface 1110, processor 1120, memory 1130, and scanning display system 1102. Scanning display system 1102 may be any scanning display system that includes hybrid data acquisition circuits as described above. For example, scanning display system 1102 may include scanning display system 100 (FIG. 1) or scanning display system 200 (FIG. 2).

Scanning display system 1102 may receive image data from any image source. For example, in some embodiments, scanning display system 1102 includes memory that holds still images. In other embodiments, scanning display system 1102 includes memory that includes video images. In still further embodiments, scanning display system 1102 displays imagery received from external sources such as connectors, wireless interface 1110, a wired interface, or the like.

Wireless interface 1110 may include any wireless transmission and/or reception capabilities. For example, in some embodiments, wireless interface 1110 includes a network interface card (NIC) capable of communicating over a wireless network. Also for example, in some embodiments, wireless interface 1110 may include cellular telephone capabilities. In still further embodiments, wireless interface 1110 may include a global positioning system (GPS) receiver. One skilled in the art will understand that wireless interface 1110 may include any type of wireless communications capability without departing from the scope of the present invention.

Processor 1120 may be any type of processor capable of communicating with the various components in mobile device 1100. For example, processor 1120 may be an embedded processor available from application specific integrated circuit (ASIC) vendors, or may be a commercially available microprocessor. In some embodiments, processor 1120 provides image or video data to scanning display system 1102. The image or video data may be retrieved from wireless interface 1110 or may be derived from data retrieved from wireless interface 1110. For example, through processor 1120, scanning display system 1102 may display images or video received directly from wireless interface 1110. Also for example, processor 1120 may provide overlays to add to images and/or video received from wireless interface 1110, or may alter stored imagery based on data received from wireless interface 1110 (e.g., modifying a map display in GPS embodiments in which wireless interface 1110 provides location coordinates).

Figure 12:
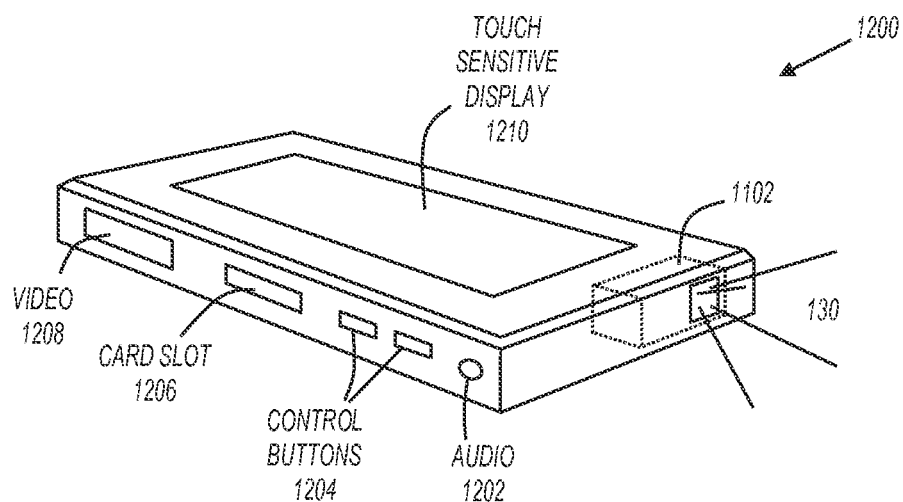
FIG. 12 shows a mobile device in accordance with various embodiments of the present invention.

FIG. 12 shows a mobile device in accordance with various embodiments of the present invention. Mobile device 1200 may be a hand held scanning display system with or without communications ability. For example, in some embodiments, mobile device 1200 may be a scanning display system with little or no other capabilities. Also for example, in some embodiments, mobile device 1200 may be a device usable for communications, including for example, a cellular phone, a smart phone, a tablet computing device, a global positioning system (GPS) receiver, or the like. Further, mobile device 1200 may be connected to a larger network via a wireless (e.g., cellular), or this device can accept and/or transmit data messages or video content via an unregulated spectrum (e.g., WiFi) connection.

Mobile device 1200 includes scanning display system 1102, touch sensitive display 1210, audio port 1202, control buttons 1204, card slot 1206, and audio/video (A/V) port 1208. None of these elements are essential. For example, mobile device 1200 may only include scanning display system 1102 without any of touch sensitive display 1210, audio port 1202, control buttons 1204, card slot 1206, or A/V port 1208. Some embodiments include a subset of these elements. For example, an accessory projector may include scanning display system 1102, control buttons 1204 and A/V port 1208. A smartphone embodiment may combine touch sensitive display device 1210 and display system 1102.

Touch sensitive display 1210 may be any type of display. For example, in some embodiments, touch sensitive display 1210 includes a liquid crystal display (LCD) screen. In some embodiments, display 1210 is not touch sensitive. Display 1210 may or may not always display the image projected by scanning display system 1102. For example, an accessory product may always display the projected image on display 1210, whereas a mobile phone embodiment may project a video while displaying different content on display 1210. Some embodiments may include a keypad in addition to touch sensitive display 1210.

A/V port 1208 accepts and/or transmits video and/or audio signals. For example, A/V port 1208 may be a digital port, such as a high definition multimedia interface (HDMI) interface that accepts a cable suitable to carry digital audio and video data. Further, A/V port 1208 may include RCA jacks to accept or transmit composite inputs. Still further, A/V port 1208 may include a VGA connector to accept or transmit analog video signals. In some embodiments, mobile device 1200 may be tethered to an external signal source through A/V port 1208, and mobile device 1200 may project content accepted through A/V port 1208. In other embodiments, mobile device 1200 may be an originator of content, and A/V port 1208 is used to transmit content to a different device.

Audio port 1202 provides audio signals. For example, in some embodiments, mobile device 1200 is a media recorder that can record and play audio and video. In these embodiments, the video may be projected by scanning display system 1102 and the audio may be output at audio port 1202.

Mobile device 1200 also includes card slot 1206. In some embodiments, a memory card inserted in card slot 1206 may provide a source for audio to be output at audio port 1202 and/or video data to be projected by scanning display system 1102. Card slot 1206 may receive any type of solid state memory device, including for example secure digital (SD) memory cards.

Figure 13:
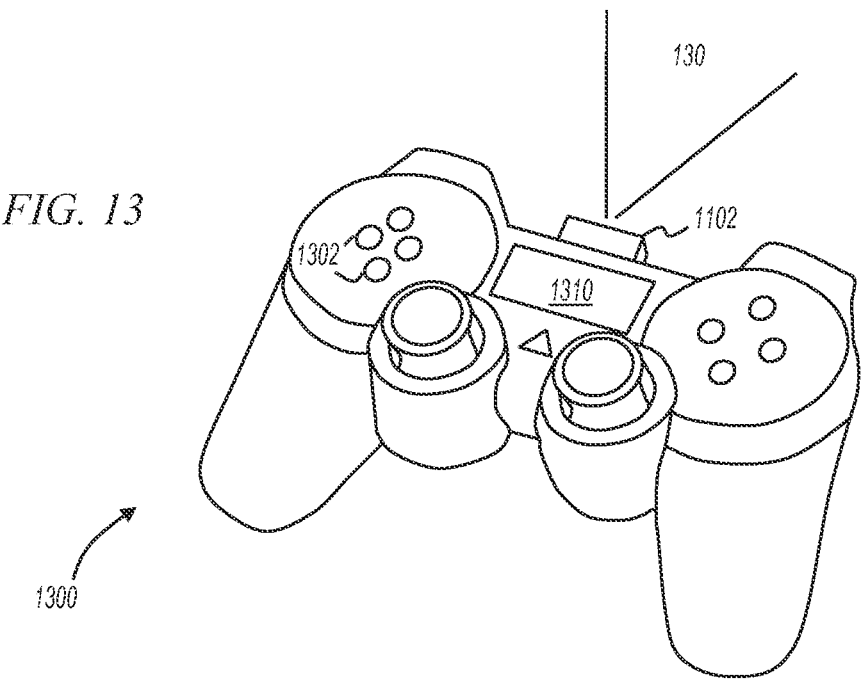
FIG. 13 shows a gaming apparatus in accordance with various embodiments of the present invention.

FIG. 13 shows a gaming apparatus in accordance with various embodiments of the present invention. Gaming apparatus 1300 includes buttons 1302, display 1310, and display system 1102. In some embodiments, gaming apparatus 1300 is a standalone apparatus that does not need a larger console for a user to play a game. For example, a user may play a game while watching display 1310 and/or the projected content at 130. In other embodiments, gaming apparatus 1300 operates as a controller for a larger gaming console. In these embodiments, a user may watch a larger screen tethered to the console in combination with watching display 1310 and/or projected content at 130.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    creating first infrared light pulses having a first modulation characteristic, a first power level and a first inter-pulse spacing;
    scanning the first infrared light pulses in a field of view;
    creating visible laser light pulses;
    scanning the visible laser light pulses in the field of view to create an image;
    wherein the first inter-pulse spacing is greater than an inter-pulse spacing of the visible laser light pulses;
    measuring a time-of-flight of the first infrared light pulses to detect a distance to a projection surface and a distance to a pointing object;
    when a difference between the distance to the projection surface and the distance to the pointing object is less than a threshold,
        creating second infrared light pulses having a second modulation characteristic; a second power level, and a second inter-pulse spacing, wherein the second inter-pulse spacing is substantially equal to the inter-pulse spacing of the visible laser light pulses;
        scanning the second infrared light pulses in a region around the pointing object;
        receiving reflections of the second infrared light pulses to determine an x,y position of the pointing object in the field of view; and
        providing an indication of a touch event at the x,y position.

2. The method of claim 1 wherein first modulation characteristic is a triangular wave.

3. The method of claim 1 wherein second modulation characteristic is a square wave.

4. The method of claim 1 wherein the first power level is higher than the second power level.

5. The method of claim 1 wherein the first inter-pulse spacing is greater than the second inter-pulse spacing.

6. A method comprising:
    creating visible laser light pulses;
    creating first infrared laser light pulses having a first inter-pulse spacing, wherein the first inter-pulse spacing is greater than an inter-pulse spacing of the visible laser light pulses;
    scanning the first infrared laser light pulses in a field of view of a scanning display system;
    scanning the visible laser light pulses in the field of view to create an image;
    determining a first distance to a pointing object and a second distance to a projection surface in the field of view of the scanning display system by measuring time-of-flight (TOF) of the first infrared laser light pulses;
    determining a difference between the first distance and the second distance; and
    when the difference is less than a threshold, modifying the infrared laser light pulses to have a second inter-pulse spacing, wherein the second inter-pulse spacing is substantially equal to the inter-pulse spacing of the visible laser light pulses, scanning the infrared laser light pulses in a subset of the field of view in a region around the pointing object, and sensing if a reflection of one of the infrared laser light pulses is received to increase resolution of a position of the pointing object in the field of view.

7. The method of claim 6 further comprising sending an indication of a touch event.

8. The method of claim 6 wherein the infrared laser light pulses used for TOF measurements are higher power than the laser light pulses used for sensing a reflection to increase resolution.

9. A scanning display system comprising:
    at least one visible laser light source;
    at least one infrared laser light source;
    a scanning mirror to reflect and scan modulated laser light pulses received from the at least one visible laser light source and at least one infrared laser light source into a field of view;
    a time-of-flight detection circuit to detect a time-of-flight of reflected infrared laser light pulses;
    a position detection circuit to correlate timing of reflected infrared laser light pulses with movement of the scanning mirror to determine an x, y position of a reflector in the field of view; and
    a control circuit to drive the at least one visible laser light source to create visible modulated laser light pulses, and to drive the at least one infrared laser light source with first pulses having a first inter-pulse spacing greater than an inter-pulse spacing of the visible modulated laser light pulses and to switch to driving the at least one infrared light source with second pulses having a second inter-pulse spacing that is substantially equal to the inter-pulse spacing of the visible modulated laser light pulses when the time-of-flight detection circuit determines that a pointing object in the field of view is close to a projection surface.

10. The scanning display system of claim 9 wherein the at least one infrared laser light source comprises:
   a first infrared laser light source to be driven by the first pulses; and
   a second infrared laser light source to be driven by the second pulses.

11. The scanning display system of claim 9 wherein the first pulses have a power level that is greater than a power level of the second pulses.

12. The scanning display system of claim 9 wherein the control circuit is configured to provide an indication of a touch event at the location of the pointing object.

13. A scanning display system comprising:
   at least one visible laser light source that produces visible laser light pulses;
   a first infrared laser light source that produces first infrared laser light pulses at a first wavelength having an inter-pulse spacing greater than an inter-pulse spacing of the visible laser light pulses;
   a second infrared laser light source that produces second infrared laser light pulses at a second wavelength having an inter-pulse spacing substantially equal to the inter-pulse spacing of the visible laser light pulses;
   a scanning mirror to reflect and scan the laser light pulses received from the at least one visible laser light source, the first infrared laser light source, and the second infrared laser light source into a field of view;
   a time-of-flight detection circuit to detect a time-of-flight of reflected infrared laser light pulses at the first wavelength; and
   a position detection circuit to correlate timing of reflected infrared laser light pulses at the second wavelength with movement of the scanning mirror to determine an x, y position of a reflector in the field of view.

14. The scanning display system of claim 13 wherein the first infrared laser light pulses have a power level that is greater than a power level of the second infrared laser light pulses.

* * * * *